US012659273B2

(12) United States Patent
Mishra et al.

(10) Patent No.: US 12,659,273 B2
(45) Date of Patent: Jun. 16, 2026

(54) OVERLAY-BASED OAM FOR BGP FAULT DETECTION

(71) Applicant: Cisco Technology, Inc., San Jose, CA (US)

(72) Inventors: Mankamana Prasad Mishra, San Jose, CA (US); Lukas Krattiger, The Woodlands, TX (US); Frank Brockners, Cologne (DE); Nitin Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 333 days.

(21) Appl. No.: 18/372,443

(22) Filed: Sep. 25, 2023

(65) Prior Publication Data

US 2025/0016092 A1 Jan. 9, 2025

Related U.S. Application Data

(60) Provisional application No. 63/525,238, filed on Jul. 6, 2023.

(51) Int. Cl.
| | |
|---|---|
| *H04L 43/10* | (2022.01) |
| *H04L 43/0817* | (2022.01) |
| *H04L 45/64* | (2022.01) |

(52) U.S. Cl.
CPC .......... *H04L 45/64* (2013.01); *H04L 43/0817* (2013.01); *H04L 43/10* (2013.01)

(58) Field of Classification Search
CPC ..... H04L 43/0817; H04L 43/10; H04L 45/28; H04L 45/64
See application file for complete search history.

(56) References Cited

U.S. PATENT DOCUMENTS

| | | | | |
|---|---|---|---|---|
| 7,978,708 B2 * | 7/2011 | Filsfils | ................... | H04L 45/03 |
| | | | | 370/254 |
| 8,667,174 B2 * | 3/2014 | Uttaro | .................. | H04L 45/033 |
| | | | | 709/239 |

(Continued)

FOREIGN PATENT DOCUMENTS

| | | |
|---|---|---|
| CN | 101252488 A | 8/2008 |
| CN | 100550859 C | 10/2009 |

OTHER PUBLICATIONS

International Search Report and Written Opinion for International Application No. PCT/US2024/036500, mailed Oct. 15, 2024, 12 Pages.

*Primary Examiner* — Jason D Cardone
(74) *Attorney, Agent, or Firm* — Lee & Hayes, P.C.

(57) ABSTRACT

Techniques for generating and utilizing overlay-based Border Gateway Protocol (BGP) Operations, Administration, and Maintenance (OAM) packets to detect issues with an underlay network. The techniques may include receiving, from a BGP peer device via a control plane path, an OAM probe indicating a forwarding path to be used for sending the traffic to a destination associated with a prefix. The techniques may also include determining, based at least in part on the OAM probe, that a next-hop device is incapable of being utilized to forward the traffic to the destination, the next-hop device determined based on an origination of the prefix. The techniques may further include performing a policy-based action based at least in part on determining that the next-hop device is incapable of being utilized to forward the traffic to the destination.

20 Claims, 7 Drawing Sheets

(56) References Cited

U.S. PATENT DOCUMENTS

| | | | | |
|---|---|---|---|---|
| 10,193,796 B2* | 1/2019 | Perrett | ................. | H04L 45/021 |
| 11,425,056 B1* | 8/2022 | Kumar | ................... | H04L 45/34 |
| 2015/0326469 A1 | 11/2015 | Kern et al. | | |
| 2018/0013670 A1 | 1/2018 | Kapadia et al. | | |
| 2019/0166036 A1* | 5/2019 | Tappin | ................. | H04L 45/033 |
| 2019/0222496 A1 | 7/2019 | Dorai et al. | | |
| 2021/0218663 A1* | 7/2021 | Kaliyamoorthy | ....... | H04L 45/02 |
| 2021/0385155 A1 | 12/2021 | Suryanarayana et al. | | |
| 2022/0191120 A1* | 6/2022 | Dikshit | ............... | H04L 43/0817 |
| 2022/0210038 A1* | 6/2022 | Pueblas | .................. | H04L 43/20 |
| 2022/0224629 A1 | 7/2022 | Mada et al. | | |
| 2023/0076025 A1 | 3/2023 | Shaw et al. | | |
| 2024/0031266 A1* | 1/2024 | Dikshit | ............... | H04L 12/4633 |
| 2025/0016092 A1* | 1/2025 | Mishra | ................... | H04L 43/10 |

* cited by examiner

400 ⬎

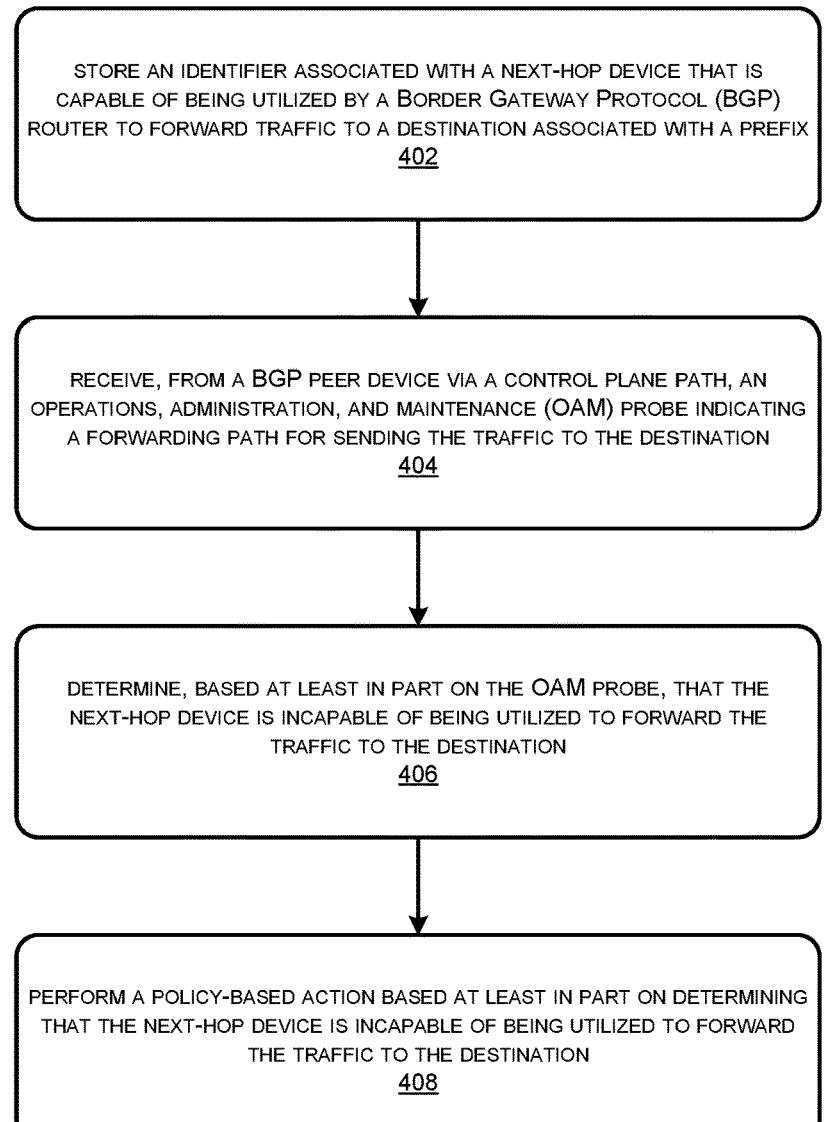

STORE AN IDENTIFIER ASSOCIATED WITH A NEXT-HOP DEVICE THAT IS
CAPABLE OF BEING UTILIZED BY A BORDER GATEWAY PROTOCOL (BGP)
ROUTER TO FORWARD TRAFFIC TO A DESTINATION ASSOCIATED WITH A PREFIX
402

RECEIVE, FROM A BGP PEER DEVICE VIA A CONTROL PLANE PATH, AN
OPERATIONS, ADMINISTRATION, AND MAINTENANCE (OAM) PROBE INDICATING
A FORWARDING PATH FOR SENDING THE TRAFFIC TO THE DESTINATION
404

DETERMINE, BASED AT LEAST IN PART ON THE OAM PROBE, THAT THE
NEXT-HOP DEVICE IS INCAPABLE OF BEING UTILIZED TO FORWARD THE
TRAFFIC TO THE DESTINATION
406

PERFORM A POLICY-BASED ACTION BASED AT LEAST IN PART ON DETERMINING
THAT THE NEXT-HOP DEVICE IS INCAPABLE OF BEING UTILIZED TO FORWARD
THE TRAFFIC TO THE DESTINATION
408

FIG. 4

OVERLAY-BASED OAM FOR BGP FAULT DETECTION

RELATED CASES

This application claims priority to U.S. Provisional Application No. 63/525,238 filed on Jul. 6, 2023, the entire contents of which is incorporated herein by reference in its entirety and for all purposes.

TECHNICAL FIELD

The present disclosure relates generally to techniques for, among other things, the generation and utilization of overlay Border Gateway Protocol (BGP) Operations, Administration, and Maintenance (OAM) packets, which are forwarded between BGP peers via a control plane path, to determine if there are issues with an underlay network.

BACKGROUND

Border Gateway Protocol (BGP) is a crucial routing protocol used in the Internet and large-scale computer networks, as well as one of the primary protocols used in service provider networks and data centers. BGP enables communication and data exchange between network domains operated by different organizations or Internet Service Providers (ISPs) and plays a fundamental role in ensuring that data packets reach their intended destinations efficiently and securely. The primary function of BGP is to exchange routing information between routers in different network domains and determine the best path for data packets to traverse across multiple networks to reach their destination. When multiple paths to a destination are available, BGP uses a set of criteria, known as the BGP best path selection algorithm, to determine the optimal route based on factors like path length and other attributes.

In recent years, however, studies have shown various scenarios in which BGP has led to outages. Of these scenarios, one of the most problematic cases leading to outages is when a BGP peer withdraws a route and the route is not actually cleared (e.g., due to an internal software bug). As such, the route is still pointing to an incorrect next hop and these cases can lead to traffic outages for a whole prefix in a region.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 is a flow diagram illustrating an example method associated with the techniques described herein.

DESCRIPTION OF EXAMPLE EMBODIMENTS

Overview

Figure 1:
FIG. 1 is a system diagram illustrating an example architecture which may utilize various aspects of the techniques disclosed herein.

This application is directed to techniques for generating and utilizing overlay BGP OAM packets, which are forwarded between BGP peers via a control plane path, to determine if there are issues with an underlay network. By way of example, and not limitation, the techniques disclosed herein may include storing, in a control plane forwarding table associated with a BGP router, an identifier associated with a next-hop device that is capable of being utilized by the BGP router to forward traffic to a destination associated with a prefix. In some examples, the techniques may also include receiving, from a BGP peer device via a control plane path, an OAM probe indicating a forwarding path to be used for sending the traffic to the destination. Based at least in part on the OAM probe, a determination may be made that the next-hop device is incapable of being utilized to forward the traffic to the destination. The techniques may also include performing a policy-based action based at least in part on determining that the next-hop device is incapable of being utilized to forward the traffic to the destination.

Additionally, the techniques described herein may be performed as a method and/or by a system having non-transitory computer-readable media storing computer-executable instructions that, when executed by one or more processors, performs the techniques described above and herein.

Example Embodiments

As noted above, studies have shown various scenarios in which BGP has led to network outages, and one of the most problematic cases leading to outages is when a BGP peer withdraws a route and the route is not actually cleared (e.g., due to an internal software bug). As such, the route is still pointing to an incorrect next hop and these cases can lead to traffic outages for a whole prefix in a region.

As an example of such a scenario, suppose that a first route reflector (RR-1) in a BGP region sends or otherwise advertises a route to a first router (R1) in the BGP region, the route indicating that there are two next hops to reach a specific prefix (P/24), one being through a second router (R2) and a third router (R3). However, assume there is a subsequent network change associated with R2 (e.g., a network change between R2 and R2's next hop router to reach P/24) that leads to a situation in which R2 is no longer a viable next hop for R1 to send data to P/24. As a result, R3 might withdraw the route from RR-1. Unfortunately, when RR-1 sends the withdrawal to R1, R1 does not clear the route due to a software issue and, therefore, R1 has a stale entry for P/24 which results in a forwarding entry at R1 that P/24 is still reachable via both R2 and R3, even though P/24 is not actually reachable through R2 anymore. As such, when a packet reaches R1 that needs to be sent to P/24, R1 may select R2 as the next hop. However, because R2 no longer knows how to reach P/24, R2 would cause the packet/traffic to be dropped. To add to the complexity of these outage scenarios, traditional OAM techniques that forward probe packets via data plane (or underlay) paths are not always capable of detecting these faults. Thus, there is a need to debug such inconsistencies between BGP peers and, apart from that, current OAM techniques are defined to only collect data for underlay networks where an end-to-end traffic path is processed, and not to collect data for the overlay network.

This disclosure is directed to techniques for fault detection between BGP peers in which BGP OAM techniques are used, in combination with a data plane, to validate overlay BGP peer information and provide end-to-end fault detection. For example, a BGP OAM packet may be generated for a given prefix and then forwarded (e.g., software forwarded via a control plane path) to next BGP peers (e.g., not necessarily BGP next-hops), and data may be collected in the BGP peers to compute or otherwise determine whether an inconsistency is present. The techniques disclosed herein utilize overlay OAM for BGP which is forwarded via BGP peers instead of next-hop as it exercises the control plane path instead of the data plane path to find out inconsistencies in the control plane and provides another way to reach out BGP peers if there issues with the underlay network. If such an inconsistency or underlay issue is present, then one or more corrective actions may be performed based on a local policy, those actions including, but not limited to, refreshing the route, re-downloading the route, notifying BGP peers, reporting the inconsistency/failure, etc. The techniques disclosed herein may detect if overlay and underlay forwarding information are out of sync, and, in some instances, take corrective or preventive action if so.

For instance, to continue the example from above utilizing the techniques disclosed herein, when a BGP OAM packet related to the P/24 prefix is sent by RR-1 to R1, R1 may immediately raise and error stating the discrepancy between the information that RR-1 has and the information that R1 has. For instance, the BGP OAM packet sent from RR-1 would indicate that, for R1, the only next hop to reach P/24 is R3 (because R2 had withdrawn the prefix already), whereas the local R1 BGP table would indicate that two next hops are available, those being R2 and R3 since R1 had not withdrawn R2 due to the software issue. Thus, using the techniques disclosed herein, the router R1 can detect this information discrepancy and flag it. Additionally, depending on the configured local policy, a re-download for this P/24 prefix may be triggered so that R1 can clean up its local stale entry.

The techniques of this disclosure may be adapted and applied to a variety of BGP topologies and architectures and are not specifically limited to the examples disclosed herein. For instance, while the example above describes the use of a route reflector, the techniques disclosed herein are applicable to topologies and architectures that do not include a route reflector. For explanatory purposes, a route reflector is a specific type of BGP device/router that is typically used in large-scale networks to simplify the distribution of routing information within an autonomous system. In typical BGP configurations, all routers within an autonomous system may have a full mesh of Internal BGP (iBGP) sessions with each other, which can become highly complex and resource-intensive as the number of routers in the autonomous system grows. To address the challenges of managing a full mesh topology, a route reflector may be introduced to create a more scalable and efficient BGP setup. The primary purpose of a route reflector is to eliminate the need for each router within the autonomous system to establish iBGP sessions with all other routers, reducing the number of connections required and conserving resources. Thus, the techniques disclosed herein are equally applicable to autonomous systems that utilize route reflectors, as well as those that do not.

By way of example, and not limitation, a method according to the techniques disclosed herein may include storing, in a control plane forwarding table, an identifier associated with a next-hop device (e.g., BGP next-hop device) that is capable of being utilized by the BGP router to forward traffic to a destination associated with a prefix. For example, the identifier associated with the next-hop device may be stored in the control plane forwarding table by the BGP router based on receiving an advertised route associated with the prefix. For instance, the advertised route may be received from a BGP peer device during origination of the prefix, such as from a BGP router, a BGP route reflector, or the like. That is, the prefix may be originated or otherwise advertised among BGP peer devices by a BGP source router that the prefix is behind.

In some examples, the method may also include receiving, from the BGP peer device via a control plane path (or overlay path), an OAM probe packet indicating a forwarding path that is to be used for sending the traffic to the destination prefix. That is, instead of the OAM probe packet being received via a data plane (or underlay) path, per usual, the OAM probe packet may traverse and be received via the control plane path. In such examples, the BGP peer device may be a BGP route reflector. For instance, because the OAM probe is a control plane/overlay-specific packet, the OAM probe may be sent to the BGP route reflector if such a route reflector is deployed in a system. In contrast, if the OAM probe was a traditional, data plane/underlay-specific packet, then the packet would likely not be forwarded to the BGP route reflector. This is because, in some examples, BGP route reflectors may not include data plane elements or otherwise participate as part of the data plane/underlay for forwarding data packets.

In some examples, the OAM probe packet may be originated by the BGP source router that advertised the prefix and software forwarded to the BGP router along the control plane/overlay path. In some examples, the BGP peer device may be one of multiple BGP peer devices disposed along the control plane/overlay path between the BGP source router and the BGP router. In some examples, each one of the multiple BGP peer devices may be configured to forward (e.g., software forward along the control plane path) the OAM probe packet from the BGP source router to the BGP router. In some examples, next-hop device for the advertised path may be distinguishable from the BGP peer device that forwarded the OAM probe to the BGP router.

In some examples, the method may include determining, based at least in part on the OAM probe packet, that the next-hop device (e.g., from the original, advertised path) is incapable of being utilized to forward the traffic to the destination prefix. For instance, the OAM probe packet may be indicative of a network change causing the next-hop device to no longer be capable of forwarding the traffic to the destination prefix. In some examples, the next-hop device may have initiated a removal of the route for the prefix based on the network change, but due to a software or other error the route may have not been removed by the BGP router from its own forwarding table. In some examples, the BGP router may be a first BGP router, the next-hop device may be a second BGP router, and the second BGP router may be incapable of being utilized to forward the traffic to the destination based at least in part on the network change between the second BGP router and a third BGP router. In such an example, the first BGP router and the second BGP router may be associated with a first autonomous system (or first BGP region) and the third BGP router may be associated with a second autonomous system (or second BGP region).

In some examples, determining that the next-hop device is incapable of being utilized to forward the traffic to the destination may be based on an underlay OAM probe in combination with the overlay OAM probe described above. For instance, an underlay OAM probe packet may be received via a data plane path. Based at least in part on the overlay OAM probe and the underlay OAM probe, a discrepancy may be detected or otherwise determined between the forwarding path and the original, advertised path for sending the traffic to the destination.

In some examples, the method may also include performing a policy-based action based at least in part on determining that the next-hop device is incapable of being utilized to forward the traffic to the destination. For instance, the policy-based action may include causing the BGP peer device to redistribute routes associated with the prefix. Additionally, or alternatively, the policy-based action may include updating the control plane forwarding table to remove the identifier associated with the next-hop device for the prefix.

In some examples, the BGP router itself may originate anew OAM probe packet that is to be sent in a reverse direction along the control plane path to the BGP source router. In some examples, the origination of this new OAM probe packet may be included as part of the policy-based action, or the origination of this OAM probe may be done independent of detecting the network change. For instance, the BGP router may be configured to generate a BGP OAM overlay probe packet at predetermined intervals (e.g., once every minute, etc.).

According to the techniques disclosed herein, several advantages in computer-related technology can be realized. For instance, this disclosure describes overlay OAM probe packets for BGP that can be forwarded between BGP peers instead of next-hop devices. Additionally, the overlay BGP OAM techniques disclosed herein exercise the control plane path instead of the data plane path to find inconsistencies in the control plane and provide another way to reach BGP peers if there is an issue with the underlay network. In this way, BGP overlay OAM and existing underlay OAM can be used in unison to identify whether an issue is related to the underlay or the overlay. As such, the techniques described herein may provide a way to isolate problems quickly in large networks and take proactive measures before outages occur. Other improvements in computer-related technology will be readily apparent to those having ordinary skill in the art.

Certain implementations and additional embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 is a system diagram illustrating an example architecture 100 which may utilize various aspects of the techniques disclosed herein. The architecture 100 includes a first BGP region 102(1) and a second BGP region 102(2). In examples, the different BGP regions may be associated with different countries, different autonomous systems, different network, or the like. For instance, the first BGP region 102(1) may represent the United States, while the second BGP region 102(2) may represent Canada.

In examples, the different BGP regions may include one or more BGP routers, such as the BGP routers 104(1)-104(6) disposed in or otherwise associated with the first BGP region 102(1) and the second BGP region 102(2). In examples, the different BGP regions may also include respective route reflectors, such as the route reflectors 106(1) and 106(2) (hereinafter referred to collectively as "route reflectors 106") associated with the first BGP region 102(1) and the second BGP region 102(2), respectively. The route reflectors 106 are a specific type of BGP device/router that is typically used in large-scale networks to simplify the distribution of routing information within an autonomous system. In typical BGP configurations, all routers within an autonomous system may have a full mesh of Internal BGP (iBGP) sessions with each other, which can become highly complex and resource-intensive as the number of routers in the autonomous system grows. To address the challenges of managing a full mesh topology, the route reflectors 106 may be introduced to create a more scalable and efficient BGP setup. The primary purpose of the route reflectors 106 is to eliminate the need for each of the BGP routers (104(1)-104 (6) within their respective region to establish iBGP sessions with each other, reducing the number of connections required and conserving resources.

The architecture 100 also includes various destinations, such as the first destination(s) 108(1) that are accessible via the BGP router 104(1) of the first BGP region 102(1) and the second destinations(s) 108(2) that are accessible via the BGP router 104(6) of the second BGP region 102(2). In examples, the destination(s) 108(1) and 108(2) may each be associated with their own specific prefix, which may refer to an IP address range that is associated with the specific destination(s) 108(1) and 108(2), respectively. In examples, a prefix may be represented in the form of an IP address followed by a subnet mask or prefix length. Prefixes are used to define the reachability of the destination(s) 108(1) and 108(2) within the BGP routing domain. In examples, each prefix corresponds to a route that the BGP routers 104(1)-104(6) can use to forward traffic to the specified destination(s) 108(1) and 108(2). For example, the prefix "192.168.1.0/24" indicates a range of IP addresses from 192.168.1.0 to 192.168.1.255 with a subnet mask of 24 bits, which translates to a subnet with 256 available IP addresses.

The architecture 100 also includes an underlay 110 with various underlay devices. The underlay 110 may include the foundational infrastructure that forms the physical and logical framework of a computer network. The underlay 110 may provide the essential connectivity, transport, and routing capabilities that serve as the basis for running applications and services. The network underlay 110 is crucial for ensuring efficient and reliable data transmission across the network. In examples, the underlay 110 may be part of a data plane or forwarding plane of the architecture 100 that is distinguishable from a control plane or overlay. In examples, the BGP routers 104(1)-104(6) may participate in both the control plane and the data plane (e.g., overlay and underlay), the route reflectors 106 may participate in the control plane (overlay), and the underlay 110 and its devices may participate in the data plane.

In examples, when the BGP router 104(1) originates routes for the prefix associated with the destination(s) 108 (1), the routes may be forwarded/advertised first to the route reflector 106(1) and then to each of the BGP routers 104(2) and 104(3). The route may then be forwarded/advertised between the BGP regions. For instance, the BGP router 104(2) may forward the route to the BGP router 104(4) and the BGP router 104(3) may forward the route to the BGP router 104(5). The BGP routers 104(4) and 104(5) may then each forward the routes to the router reflector 106(2), which then in turn advertises the routes to the BGP router 104(6).

Based on this route advertisement, the BGP router 104(6) may make entries in its BGP forwarding table that to reach the advertised prefix associated with the destination(s) 108 (1), traffic can be sent to either one of the BGP routers 104(4) or 104(5) (e.g., based on best available path). That is, the BGP router 104(6) may store an entry that the next-hop for traffic addressed to the prefix associated with the destination(s) 108(1) can be either BGP router 104(4) or BGP router 104(5).

However, consider the case in which reachability between the BGP routers 104(3) and 104(5) fails due to an event 114, and now the BGP router 104(5) does not have reachability to the prefix. In some examples, the BGP router 104(5) may withdraw the route from the route reflector 106(2). In response, the route reflector 106(2) may attempt to withdraw the prefix from the BGP router 104(6) stating that BGP router 104(5) may no longer be the next-hop for the prefix associated with the destination(s) 108(1). However, assume that due to a software issue, the prefix/route is not cleaned at BGP router 104(6) and is still pointing to BGP router 104(5) as a possible next-hop.

According to the techniques disclosed herein, and without knowledge of the event 114 and/or the loss of communication, the BGP router 104(1) may originate a BGP OAM probe 112 for a prefix associated with the destination(s) 108(1). In examples, the BGP OAM probe 112 may need to be software-forwarded to a BGP peer along an overlay/control plane path. In examples, the BGP OAM probe 112 may look into the BGP peer where the prefix may have been advertised and, after collecting data on the BGP router 104(1), the BGP OAM probe 112 may be sent to the route reflector 106(1). For instance, some of the data collected for the BGP router 104(1) may include where the BGP router 104(1) received the route from, other BGP peers where the route (e.g., prefix) was advertised, etc.

In examples, the BGP router 104(1) may look at a BGP forwarding table (e.g., which may be calculated for a prefix based on BGP table) and determine that the prefix is learned locally from the host and it can be advertised to the route reflector 106(1). Next, the route reflector 106(1) may receive the BGP OAM probe 112 and add BGP information related to the prefix and, if the BGP table is considered, this route may be being advertised to two different peers. So, the BGP OAM probe 112 may then be replicated to both of the BGP routers 104(2) and 104(3). This process may continue until the BGP OAM probe 112 reaches the BGP router 104(6), which may not advertise a route to anyone else so it can reply back to the originator (BGP router 104(1)) or a controller.

Now, with the BGP OAM overlay mechanisms/techniques disclosed herein, the route reflector 106(2) may send the BGP OAM probe 112 to the BGP router 104(6), and the BGP router 104(6) may immediately raise an error stating the discrepancy between the information that the route reflector 106(2) has and what the BGP router 104(6) has in its own forwarding table. In examples, local policy may trigger re-download for this prefix/route so that the BGP router 104(6) can clean up its local stale entry. For example, the BGP OAM probe 112, which came from the route reflector 106(2), may have the information for BGP router 104(6) as:

Prefix value associated with the destination(s) 108(1).

Received from BGP router 104(4) (Because BGP router 104(5) may have already withdrawn the prefix/route).

Advertised to BGP router 104(6).

In contrast, the local BGP table on the BGP router 104(6) may have an entry which says that the prefix value associated with the destination(s) 108(1) has two possible next hops, those being BGP routers 104(4) and/or 104(5). Thus, the route reflector 106(2) and/or the BGP router 104(6) may detect the information discrepancy right here and flag it. For instance, the BGP router 104(6) may perform an operation 116 to remove the route from its BGP forwarding table.

In some examples, the BGP OAM probe 112 may be generated from the originator of the prefix (as illustrated in FIG. 1) where it would traverse to BGP peers where prefixes may be advertised. Additionally, or alternatively, the BGP OAM probe 112 may be generated and advertised/forwarded in the reverse direction (e.g., from BGP router 104(6))).

In some examples, when the BGP router 104(1) originates route(s)/prefix(es) associated with the destination(s) 108(1), the BGP router 104(6) may storing an identifier associated with a next-hop device (e.g., BGP next-hop device) that is capable of being utilized by the BGP router 104(6) to forward traffic to the destination(s) 108(1). For example, the identifier associated with the next-hop device may be stored in a BGP table by the BGP router 104(6) based on receiving an advertised route associated with the prefix. For instance, the advertised route may be received from a BGP peer device (e.g., the route reflector 106(2)) during origination of the prefix. That is, the prefix may be originated or otherwise advertised among BGP peer devices by the BGP router 104(1) that the prefix is behind, and forwarded until it reaches the BGP router 104(6).

In examples, the BGP router 104(6) may receive the BGP OAM probe 112 from the route reflector 106(2) via a control plane path (or overlay path). In examples, the BGP OAM probe 112 may indicate or otherwise be used to validate a forwarding path that is to be used for sending the traffic to the destination(s) 108(1). That is, instead of the BGP OAM probe 112 packet being received via a data plane (or underlay) path, per usual, the BGP OAM probe 112 may traverse and be received via the control plane/overlay path. In such examples, because the BGP OAM probe 112 is a control plane/overlay-specific packet, the BGP OAM probe 112 may be sent to the route reflector 106(2).

In some examples, the BGP OAM probe 112 may be originated by the BGP router 104(1) that advertised the prefix and then software forwarded to the BGP router 104(6) (as well as the other BGP routers 104 and route reflectors 106 of the architecture 100) along the control plane/overlay path. In some examples, each one of the multiple BGP peer devices (e.g., BGP routers 104 and/or route reflectors 106) of the architecture 100 may be configured to forward (e.g., software forward along the control plane path) the BGP OAM probe 112 packet from the BGP router 104(1) (e.g., BGP source router) to the BGP router 104(6). In some examples, the next-hop device for the advertised path may be distinguishable from the BGP peer device that forwarded the BGP OAM probe 112 to the BGP router 104(6) (e.g., the route reflector 106(2) is distinguishable from the BGP routers 104(4) and 104(5), which are potential BGP next-hop routers in the topology shown in FIG. 1).

In some examples, the BGP router 104(6) and/or the route reflector 106(2) may determine, based at least in part on the BGP OAM probe 112, that the next-hop device (e.g., from the original, advertised path) is incapable of being utilized to forward the traffic to the destination(s) 108(1). For instance, the BGP OAM probe 112 may be indicative of a network change or other event 114 causing the next-hop device (e.g., BGP router 104(5)) to no longer be capable of forwarding the traffic to the destination(s) 108(1) (at least along its previously advertised route, that is). In some examples, the next-hop device may have initiated a removal of the route for the prefix based on the network change, but due to a software or other error the route may have not been removed by the BGP router 104(6) from its own forwarding table.

In some examples, determining that the next-hop device is incapable of being utilized to forward the traffic to the destination(s) 108(1) may be based on an underlay OAM probe in combination with the overlay BGP OAM probe 112 described above. For instance, an underlay OAM probe packet may be received via a data plane path. Based at least in part on the overlay BGP OAM probe 112 and the underlay OAM probe, a discrepancy may be detected or otherwise determined between the forwarding path and the original, advertised path for sending the traffic to the destination(s) 108(1).

In some examples, a policy-based action may be performed by the BGP router 104(6) and/or the route reflector 106(2) based at least in part on determining that the next-hop device is incapable of being utilized to forward the traffic to the destination(s) 108(1). For instance, the policy-based action may include causing the route reflector 106(2) to redistribute routes associated with the prefix. Additionally, or alternatively, the policy-based action may include updating the forwarding table to remove the identifier associated with the next-hop device for the prefix (e.g., operation 116).

Figure 2:
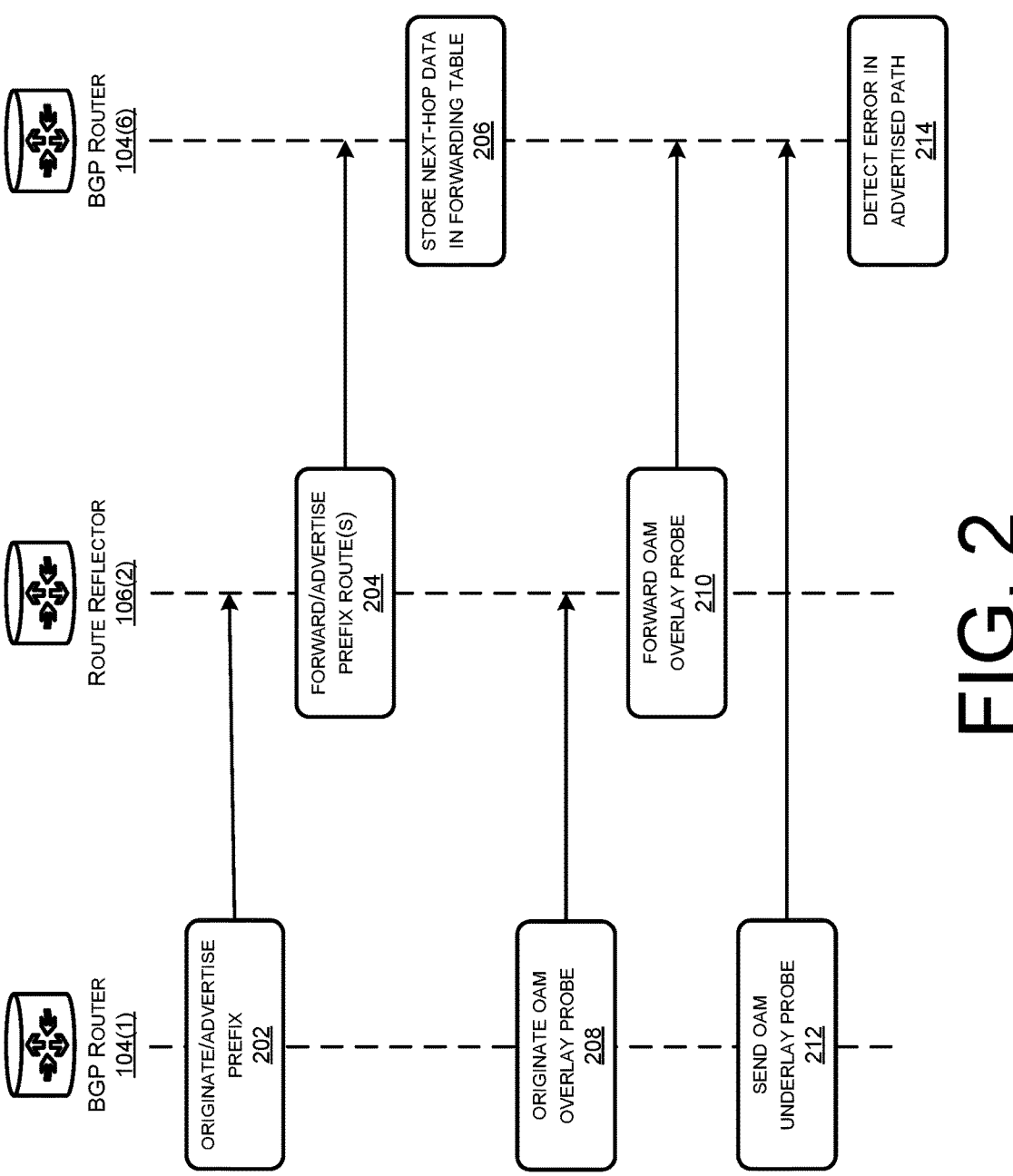
FIG. 2 is a pictorial flow diagram illustrating an example process associated with the techniques described herein.

FIG. 2 is a pictorial flow diagram illustrating an example process 200 associated with the techniques described herein. The logical operations described herein with respect to FIG. 2 may be implemented (1) as a sequence of computer-implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 2 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The operations described in FIG. 2 will be described with reference to the architecture 100 of FIG. 1, as the BGP router 104(1), the route reflector 106(2), and the BGP router 104(6) are included in FIG. 2. However, it is to be understood that more or fewer devices may play a role in the process 200 than shown in FIG. 2.

The process 200 begins at operation 202, which includes the BGP router 104(1) originating/advertising a prefix. For instance, the BGP router 104(1) may originate/advertise prefix(es) associated with the destination(s) 108(1). At operation 204, the route reflector 106(2) may forward/advertise one or more route(s) associated with the prefix. For instance, the BGP router 104(1) may advertise the route(s) for the prefix(es) associated with the destination(s) 108(1) to the BGP router 104(6), as well as other BGP routers in the same region/autonomous system as the route reflector 106 (2).

At operation 206, the BGP router 104(6) may store, in a forwarding table, next-hop data for sending traffic to the prefix. For instance, the next-hop data may indicate multiple BGP next-hop devices that can be utilized for sending the traffic to the prefix, such as the BGP routers 104(4) and 104(5). At operation 208, the BGP router 104(1) may originate an OAM overlay probe (e.g., a BGP OAM overlay probe packet). For instance, the BGP router 104(1) may originate the BGP OAM probe 112 and, at operation 210, the route reflector 106(2) may software forward the probe along the control plane path. As such, the BGP OAM probe 112 may be forwarded to the BGP router 104(6) by the route reflector 106(2) using the control plane path.

At operation 212, the BGP router 104(1) may send an OAM underlay probe packet via a data plane/underlay path. In examples, the underlay probe may be forwarded to the BGP router 104(6) via the underlay 110. At operation 214, based at least in part on the OAM overlay probe and/or the OAM underlay probe, the BGP router 104(6) may detect an error in the advertised path (e.g., the path(s)/route(s) advertised and stored in operations 202-206). For instance, while the previously stored next-hop data may indicate multiple BGP next-hop devices that can be utilized for sending the traffic to the prefix, such as the BGP routers 104(4) and 104(5), the BGP router 104(6) may determine that one of these BGP next-hop devices is no longer a valid option for forwarding traffic to the prefix.

Figure 3:
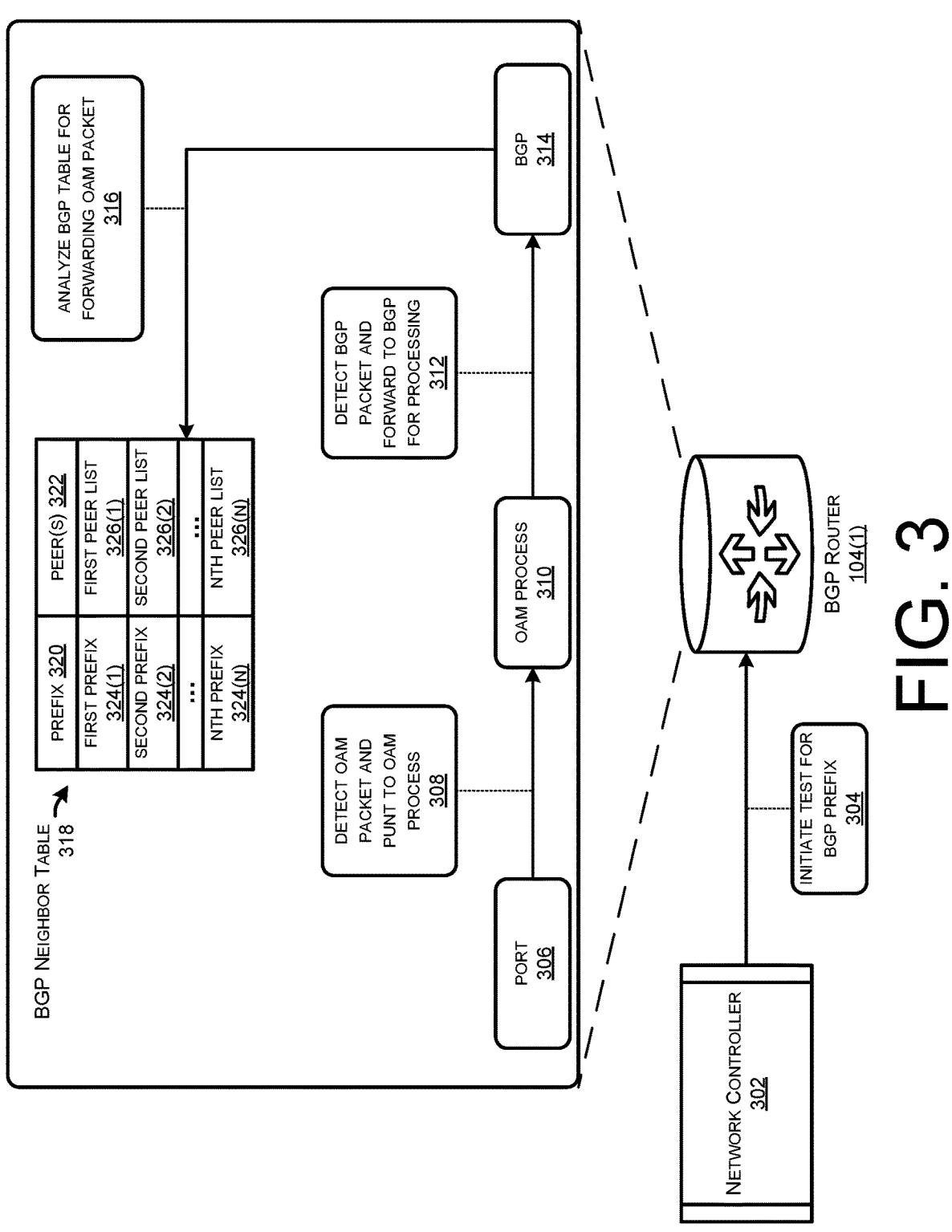
FIG. 3 is a pictorial flow diagram illustrating an example workflow associated with processing a BGP OAM packet according to the techniques described herein.

FIG. 3 is a pictorial flow diagram illustrating an example workflow 300 associated with processing a BGP OAM overlay probe packet according to the techniques described herein. The workflow 300 illustrated in FIG. 3 may go across modules for making decisions and identifying problems. For example, a network controller 302 may, at operation 304, initiate a test for a given prefix. At operation 308, packets are received on a port 306 of the BGP router 104(1), and the packets may be classified as OAM packets and, as such, punted to an OAM process 310. At operation 312, the OAM process 310 may identify the packet as intended to a BGP protocol and forward the packet to a BGP component 314. The BGP component 314 may, at operation 316, analyze the BGP neighbor table 318 for forwarding the OAM packet. In this operation, the BGP component 314 may perform two things: (1) fill the relevant data in the prefix column 320, such as which prefix value was learned (e.g., a first prefix 324(1), a second prefix 324(2), an Nth prefix 324(N), etc.) and to whom all this was advertised; and (2) look at BGP neighbor table 318 to possibly identify to which peer(s) 322 it may need to be forwarded (e.g., first peer list 326(1), second peer lest 326(2), Nth peer list 326(N), etc.). In certain examples when the receiving BGP router 104(1) is also an inline route reflector (e.g., where it is a BGP speaker for a prefix as well as it is participating in data forwarding), then it may locally validate forwarding entries in hardware if it is matching the entries in the BGP neighbor table 318 and is aligned with neighbors/peers.

FIG. 4 is a flow diagram illustrating an example method 400 associated with the techniques described herein. The logical operations described herein with respect to FIG. 4 may be implemented (1) as a sequence of computer-implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 400 begins at operation 402, which includes storing an identifier associated with a next-hop device (e.g., BGP next-hop device) that is capable of being utilized by a BGP router to forward traffic to a destination associated with a prefix. For example, the BGP router 104(6) and/or route reflector 106(2) may store the identifier associated with the next-hop device (e.g., the BGP router 104(5)) in a forwarding table based on receiving an advertised route associated with the prefix. For instance, the advertised route may be received from a BGP peer device during origination of the prefix, such as from the route reflector 106(2). In examples, the prefix may be originated or otherwise advertised among BGP peer devices by a BGP source router (e.g., BGP router 104(1)) that the prefix is behind.

At operation 404, the method 400 includes receiving, from a BGP peer device via a control plane path, an OAM probe indicating a forwarding path for sending the traffic to the destination. For instance, the BGP router 104(6) may receive the BGP OAM probe 112 from the route reflector 106(2) via the control plane/overlay path. Additionally, or alternatively, the route reflector 106(2) may receive the BGP OAM probe 112 from the BGP router 104(4). The BGP OAM probe 112 may be indicative of the forwarding path for sending the traffic to the destination(s) 108(1) associated with a prefix. For example, instead of the OAM probe packet being received via a data plane (or underlay) path, per usual, the OAM probe packet may traverse and be received via the control plane path.

At operation 406, the method 400 includes determining, based at least in part on the OAM probe, that the next-hop device is incapable of being utilized to forward the traffic to the destination. For instance, the BGP router 104(6) and/or the route reflector 106(2) may determine that the next-hop device is incapable of being utilized to forward the traffic to the destination(s) 108(1). That is, in some examples, the BGP router 104(6) and/or the route reflector 106(2) may determine a discrepancy between the BGP routing/forwarding table stored by the BGP router 104(6) and the information contained in the BGP OAM probe 112. For instance, the information in the BGP OAM probe 112 may indicate that a specific route/path is no longer valid, a next-hop device is offline, a connection failure, etc. In some examples, the determination of this discrepancy may be further based on an underlay OAM probe in combination with the overlay OAM probe.

At operation 408, the method 400 includes performing a policy-based action based at least in part on determining that the next-hop device is incapable of being utilized to forward the traffic to the destination. For instance, the BGP router

104(6) and/or the route reflector 106(2) may perform the policy-based action. In examples, the policy-based action may vary from system to system. For instance, the policy-based action may include causing the BGP peer device (e.g., route reflector 106(2), BGP router 104(1), etc.) to redistribute and/or re-originate routes associated with the prefix. Additionally, or alternatively, the policy-based action may include updating the forwarding table to remove the identifier associated with the next-hop device for the prefix (e.g., removing the route from the BGP router 104(6)).

Figure 5:
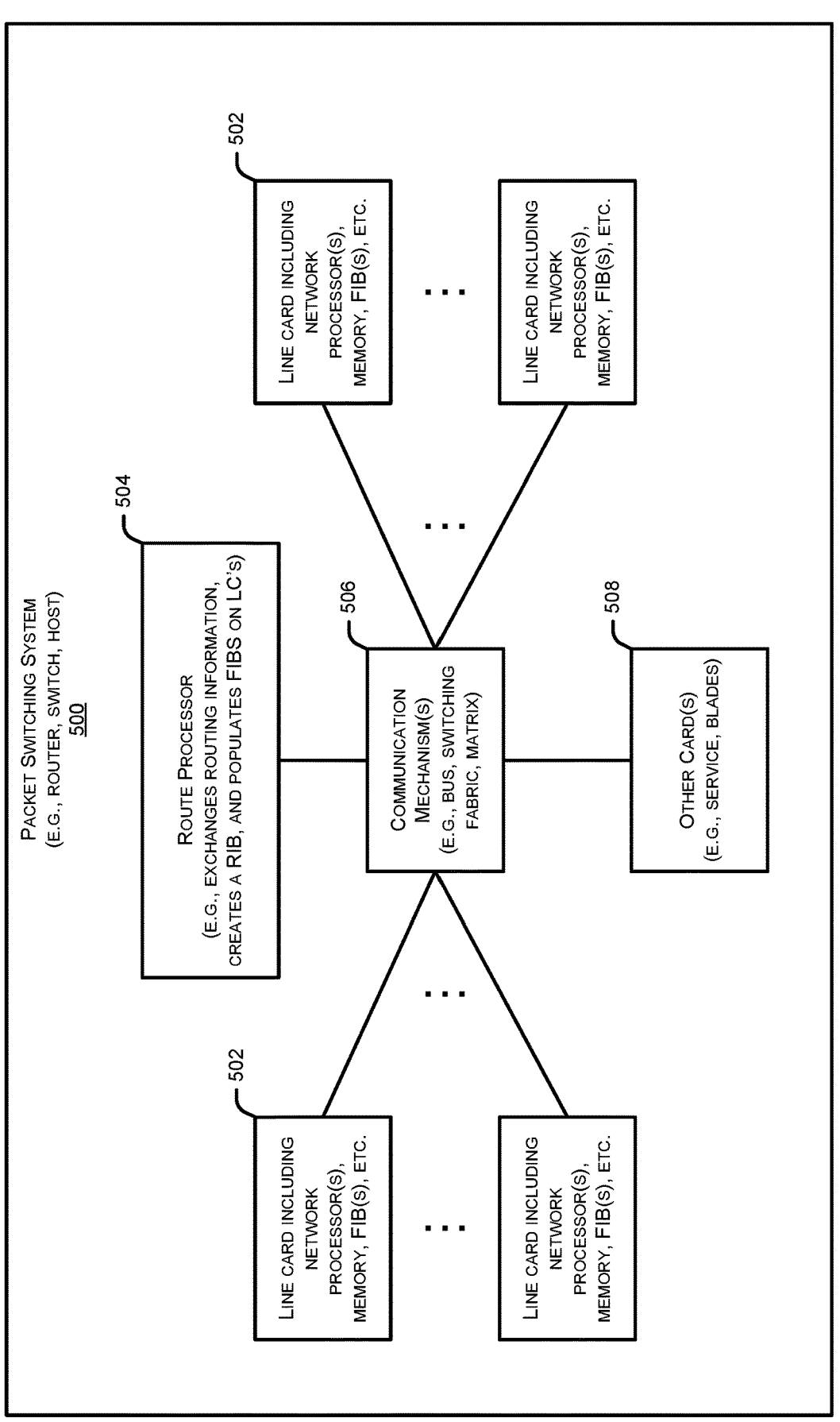
FIG. 5 is a block diagram illustrating an example packet switching system that can be utilized to implement various aspects of the technologies disclosed herein.

FIG. 5 is a block diagram illustrating an example packet switching device 500 (or packet switching system) that can be utilized to implement various aspects of the technologies disclosed herein. In some examples, packet switching device(s) 500 may be employed in various networks and architectures, such as, for example, the architecture 100 described with respect to FIG. 1. For instance, the BGP routers 104, the route reflectors 106, and/or the devices of the underlay 110 may include similar components as the packet switching device 500.

In some examples, the packet switching device 500 may comprise multiple line card(s) 502, each with one or more network interfaces for sending and receiving packets over communications links (e.g., possibly part of a link aggregation group). The packet switching device 500 may also have a control plane with one or more route processor 504 elements for managing the control plane and/or control plane processing of packets associated with forwarding of packets in a network, including, but not limited to, exchanging routing information, creating routing information base(s) (RIBs), and/or populating forward information base(s) (FIBs) on LCs. The packet switching device 500 may also include other cards 508 (e.g., service cards, blades) which include processing elements that are used to process (e.g., forward/send, drop, manipulate, change, modify, receive, create, duplicate, apply a service) packets associated with forwarding of packets in a network. The packet switching device 500 may comprise hardware-based communication mechanism 506 (e.g., bus, switching fabric, and/or matrix, etc.) for allowing its different entities to communicate. Line card(s) 502 may typically perform the actions of being both an ingress and/or an egress line card 502 in regard to multiple other particular packets and/or packet streams being received by, or sent from, packet switching device 500.

Figure 6:
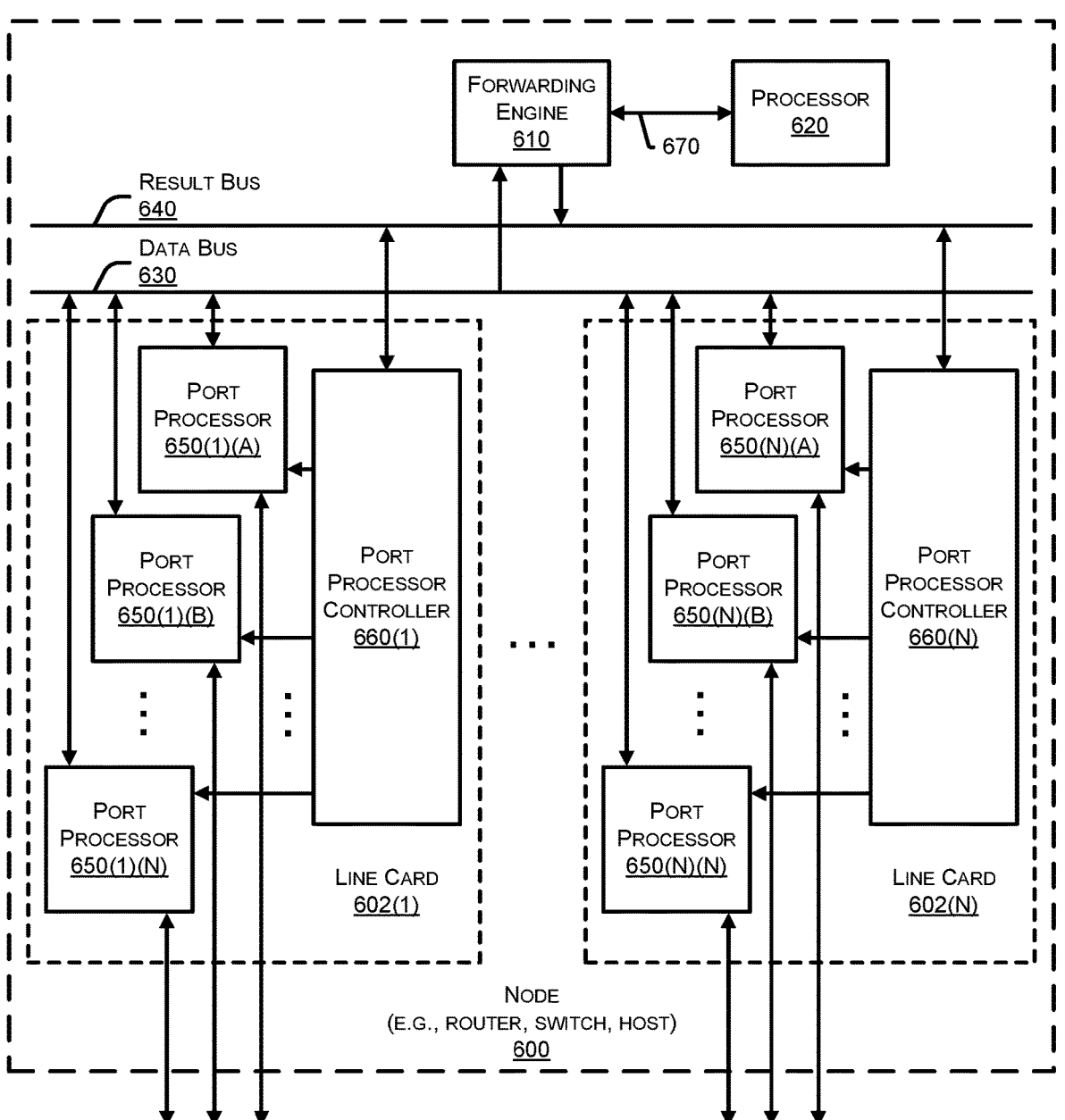
FIG. 6 is a block diagram illustrating certain components of an example node that can be utilized to implement various aspects of the technologies disclosed herein.

FIG. 6 is a block diagram illustrating certain components of an example node 600 that can be utilized to implement various aspects of the technologies disclosed herein. In some examples, node(s) 600 may be employed in various architectures and networks, such as, for example, the architecture 100 described with respect to FIG. 1.

In some examples, the node 600 may include any number of line cards 602 (e.g., line cards 602(1)–(N), where N may be any integer greater than 1) that are communicatively coupled to a forwarding engine 610 (also referred to as a packet forwarder) and/or a processor 620 via a data bus 630 and/or a result bus 640. Line cards 602(1)–(N) may include any number of port processors 650(1)(A)–(N)(N) which are controlled by port processor controllers 660(1)–(N), where N may be any integer greater than 1. Additionally, or alternatively, forwarding engine 610 and/or processor 620 are not only coupled to one another via the data bus 630 and the result bus 640, but may also communicatively coupled to one another by a communications link 670.

The processors (e.g., the port processor(s) 650 and/or the port processor controller(s) 660) of each line card 602 may be mounted on a single printed circuit board. When a packet or packet and header are received, the packet or packet and header may be identified and analyzed by node 600 (also referred to herein as a router) in the following manner. Upon receipt, a packet (or some or all of its control information) or packet and header may be sent from one of port processor(s) 650(1)(A)–(N)(N) at which the packet or packet and header was received and to one or more of those devices coupled to the data bus 630 (e.g., others of the port processor(s) 650(1)(A)–(N)(N), the forwarding engine 610 and/or the processor 620). Handling of the packet or packet and header may be determined, for example, by the forwarding engine 610. For example, the forwarding engine 610 may determine that the packet or packet and header should be forwarded to one or more of port processors 650(1)(A)–(N)(N). This may be accomplished by indicating to corresponding one(s) of port processor controllers 660 (1)–(N) that the copy of the packet or packet and header held in the given one(s) of port processor(s) 650(1)(A)–(N)(N) should be forwarded to the appropriate one of port processor(s) 650(1)(A)–(N)(N). Additionally, or alternatively, once a packet or packet and header has been identified for processing, the forwarding engine 610, the processor 620, and/or the like may be used to process the packet or packet and header in some manner and/or may add packet security information in order to secure the packet. On a node 600 sourcing such a packet or packet and header, this processing may include, for example, encryption of some or all of the packet's and/or header's information, the addition of a digital signature, and/or some other information and/or processing capable of securing the packet or packet and header. On a node 600 receiving such a processed packet or packet and header, the corresponding process may be performed to recover or validate the packet's and/or header's information that has been secured.

Figure 7:
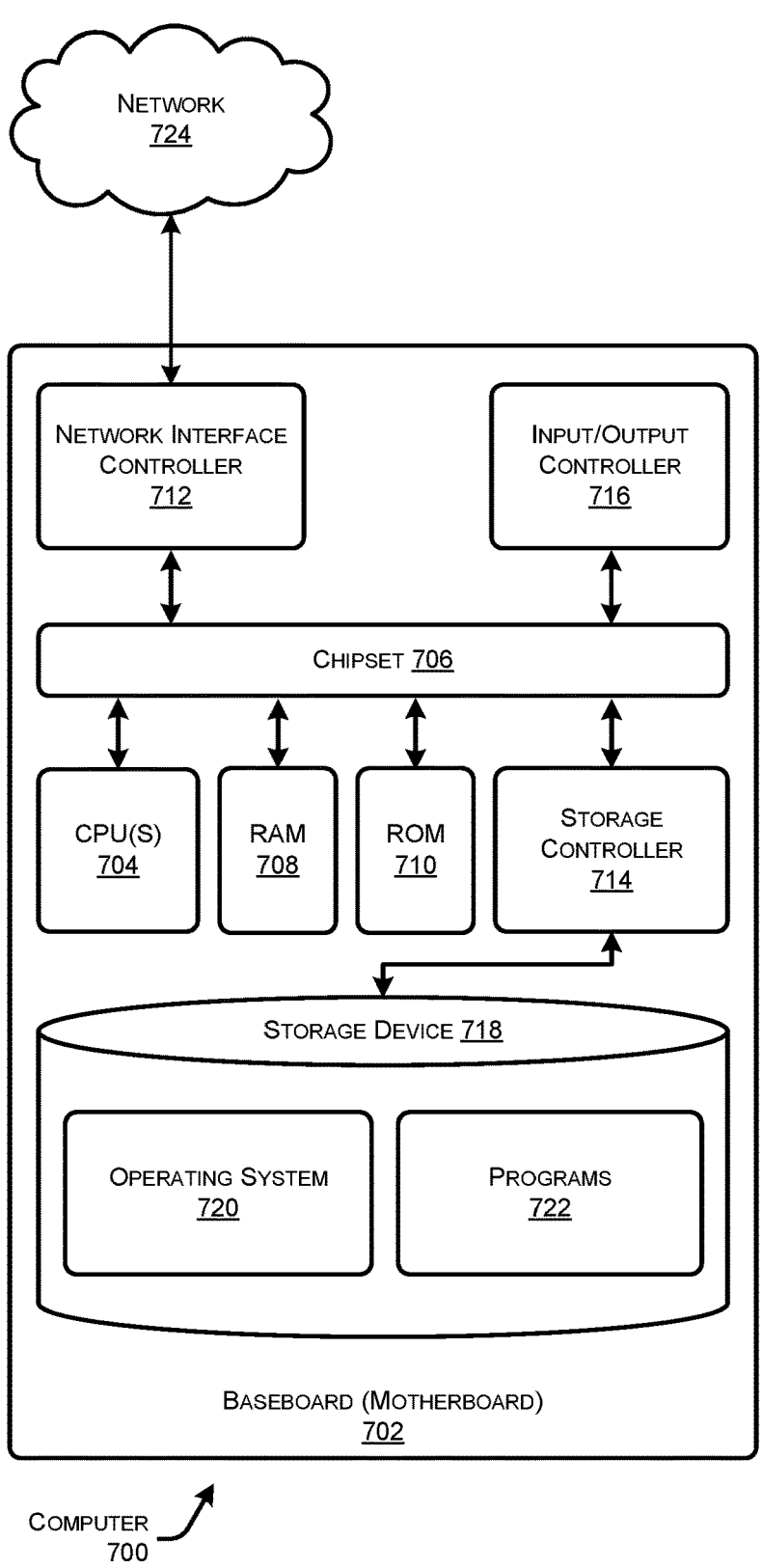
FIG. 7 is a computer architecture diagram showing an illustrative computer hardware architecture for implementing a computing device that can be utilized to implement aspects of the various technologies presented herein.

FIG. 7 is a computer architecture diagram showing an illustrative computer hardware architecture for implementing a computing device that can be utilized to implement aspects of the various technologies presented herein. The computer architecture shown in FIG. 7 may be illustrative of a conventional server computer, router, switch, workstation, desktop computer, laptop, tablet, network appliance, e-reader, smartphone, load balancer, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network. The chipset 706 can include functionality for providing network connectivity through a NIC 712, such as a gigabit Ethernet adapter. The NIC 712 is capable of connecting the computer 700 to other computing devices over the network 724, such as the BGP routers 104, the route reflectors 106, the devices of the underlay 110, the network controller 302, etc. It should be appreciated that multiple NICs 712 can be present in the computer 700, connecting the computer to other types of networks and remote computer systems. In some examples, the NIC 712 may be configured to perform at least some of the techniques described herein.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by the architecture 100 and or any components included therein, may be supported by one or more devices similar to computer 700. Stated otherwise, some or all of the operations performed by the architecture 100 and or any components included therein, may be performed by one or more computer devices 700 operating in a scalable arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes and functionality described above with regard to FIGS. 1-4, and herein. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

The computer 700 may include one or more hardware processors (processors) configured to execute one or more stored instructions. The processor(s) may comprise one or more cores. Further, the computer 700 may include one or more network interfaces configured to provide communications between the computer 700 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for detecting faults between BGP peers in which BGP OAM overlay techniques are used, in combination with a data plane, to validate overlay BGP peer information and provide end-to-end fault detection. For instance, the programs 722 may be configured to generate BGP OAM overlay probe packets, detect faults/forwarding path discrepancies based on the BGP OAM overlay probe packets, take corrective actions to avoid network outages based on detecting these faults, etc.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least partially by a Border Gateway Protocol (BGP) router, the method comprising:
   storing, in a control plane forwarding table, an identifier associated with a next-hop device that is capable of being utilized by the BGP router to forward traffic to a destination associated with a prefix;
   receiving, from a BGP peer device via a control plane path, an Operations, Administration, and Maintenance (OAM) probe indicating a forwarding path to be used for sending the traffic to the destination;
   determining that the next-hop device is incapable of being utilized to forward the traffic to the destination based at least in part on a discrepancy between forwarding path information indicated by the OAM probe and next-hop information stored in the control plane forwarding table; and
   performing a policy-based action based at least in part on determining that the next-hop device is incapable of being utilized to forward the traffic to the destination.

2. The method of claim 1, wherein the OAM probe was (i) originated by a BGP source router advertising the prefix and (ii) software forwarded to the BGP router along the control plane path.

3. The method of claim 2, wherein the BGP peer device is one of multiple BGP peer devices disposed along the control plane path between the BGP source router and the BGP router, each one of the multiple BGP peer devices configured to forward the OAM probe from the BGP source router to the BGP router.

4. The method of claim 1, wherein the policy-based action comprises at least one of causing the BGP peer device to redistribute routes associated with the prefix or updating the control plane forwarding table to remove the identifier associated with the next-hop device for the prefix.

5. The method of claim 1, wherein the BGP peer device is at least one of a route reflector or another BGP router and the next-hop device is distinguishable from the BGP peer device.

6. The method of claim 1, further comprising originating, by the BGP router, a new OAM probe that is to be sent in a reverse direction along the control plane path to a BGP source router that originated the prefix.

7. The method of claim 1, wherein the BGP router is a first BGP router, the next-hop device is second BGP router, and the second BGP router is incapable of being utilized to forward the traffic to the destination based at least in part on a network change between the second BGP router and a third BGP router, the first BGP router and the second BGP router associated with a first autonomous system and the third BGP router associated with a second autonomous system.

8. The method of claim 1, wherein the OAM probe is an overlay OAM probe and determining that the next-hop device is incapable of being utilized to forward the traffic to the destination comprises:

receiving, via a data plane path, an underlay OAM probe that is distinguishable from the overlay OAM probe; and determining, based at least in part on the overlay OAM probe and the underlay OAM probe, a discrepancy between the forwarding path and an advertised path for sending the traffic to the destination, the advertised path determined based on an origination of the prefix.

9. A system associated with a Border Gateway Protocol (BGP) router, the system comprising:

one or more processors; and one or more non-transitory computer-readable media storing instructions that, when executed, cause the one or more processors to perform operations comprising:

storing, in a control plane forwarding table, an identifier associated with a next-hop device that is capable of being utilized by the BGP router to forward traffic to a destination associated with a prefix;

receiving, from a BGP peer device via a control plane path, an Operations, Administration, and Maintenance (OAM) probe indicating a forwarding path to be used for sending the traffic to the destination;

determining that the next-hop device is incapable of being utilized to forward the traffic to the destination based at least in part on a discrepancy between forwarding path information indicated by the OAM probe and next-hop information stored in the control plane forwarding table; and performing a policy-based action based at least in part on determining that the next-hop device is incapable of being utilized to forward the traffic to the destination.

10. The system of claim 9, wherein the OAM probe was (i) originated by a BGP source router advertising the prefix and (ii) software forwarded to the BGP router along the control plane path.

11. The system of claim 10, wherein the BGP peer device is one of multiple BGP peer devices disposed along the control plane path between the BGP source router and the BGP router, each one of the multiple BGP peer devices configured to forward the OAM probe from the BGP source router to the BGP router.

12. The system of claim 9, wherein the policy-based action comprises at least one of causing the BGP peer device to redistribute routes associated with the prefix or updating the control plane forwarding table to remove the identifier associated with the next-hop device for the prefix.

13. The system of claim 9, wherein the BGP peer device is at least one of a route reflector or another BGP router and the next-hop device is distinguishable from the BGP peer device.

14. The system of claim 9, the operations further comprising originating, by the BGP router, a new OAM probe that is to be sent in a reverse direction along the control plane path to a BGP source router that originated the prefix.

15. The system of claim 9, wherein the BGP router is a first BGP router, the next-hop device is second BGP router, and the second BGP router is incapable of being utilized to forward the traffic to the destination based at least in part on a network change between the second BGP router and a third BGP router, the first BGP router and the second BGP router associated with a first autonomous system and the third BGP router associated with a second autonomous system.

16. The system of claim 9, wherein the OAM probe is an overlay OAM probe and determining that the next-hop device is incapable of being utilized to forward the traffic to the destination comprises:

receiving, via a data plane path, an underlay OAM probe that is distinguishable from the overlay OAM probe; and determining, based at least in part on the overlay OAM probe and the underlay OAM probe, a discrepancy between the forwarding path and an advertised path for sending the traffic to the destination, the advertised path determined based on an origination of the prefix.

17. One or more non-transitory computer-readable media storing instructions that, when executed, cause one or more computing devices to perform operations comprising:

storing, in a control plane forwarding table, an identifier associated with a next-hop device that is capable of being utilized by a Border Gateway Protocol (BGP) router to forward traffic to a destination associated with a prefix;

receiving, from a BGP peer device via a control plane path, an Operations, Administration, and Maintenance (OAM) probe indicating a forwarding path to be used for sending the traffic to the destination;

determining that the next-hop device is incapable of being utilized to forward the traffic to the destination based at least in part on a discrepancy between forwarding path information indicated by the OAM probe and next-hop information stored in the control plane forwarding table; and performing a policy-based action based at least in part on determining that the next-hop device is incapable of being utilized to forward the traffic to the destination.

18. The one or more non-transitory computer-readable media of claim 17, wherein the OAM probe was (i) originated by a BGP source router advertising the prefix and (ii) software forwarded to the BGP router along the control plane path.

19. The one or more non-transitory computer-readable media of claim 18, wherein the BGP peer device is one of multiple BGP peer devices disposed along the control plane path between the BGP source router and the BGP router, each one of the multiple BGP peer devices configured to forward the OAM probe from the BGP source router to the BGP router.

20. The one or more non-transitory computer-readable media of claim 17, wherein the policy-based action comprises at least one of causing the BGP peer device to redistribute routes associated with the prefix or updating the control plane forwarding table to remove the identifier associated with the next-hop device for the prefix.

* * * * *